FOLDABLE CASE SETUP APPARATUS
Original Filed Aug. 26, 1965 3 Sheets-Sheet 1
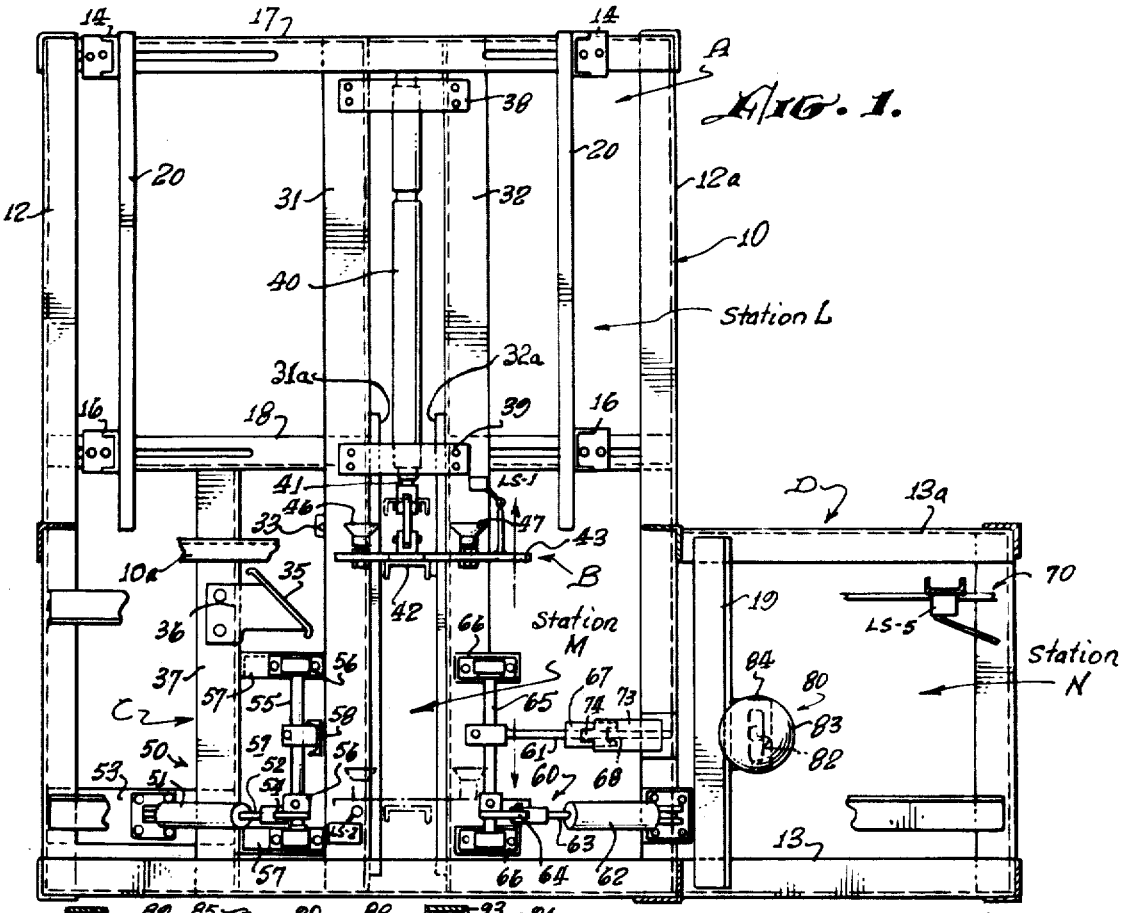
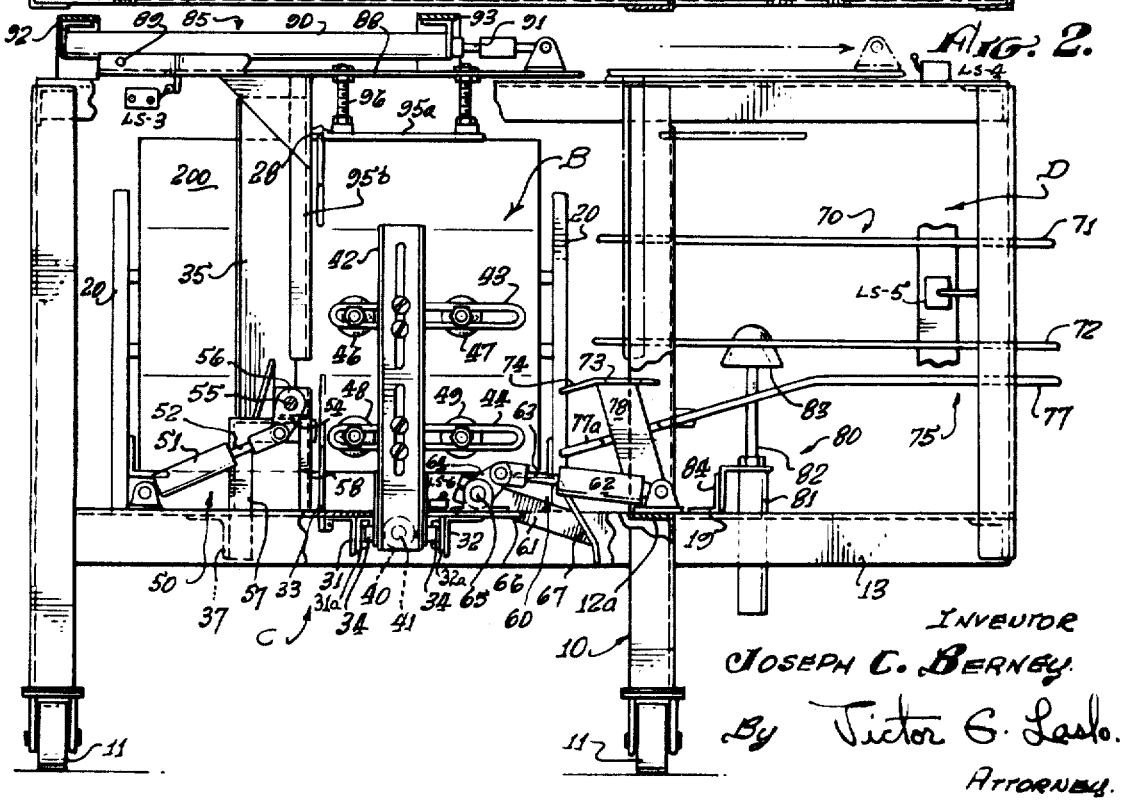
INVENTOR
JOSEPH C. BERNEY
By Victor G. Laslo.
ATTORNEY.

FOLDABLE CASE SETUP APPARATUS

Original Filed Aug. 26, 1965 3 Sheets-Sheet 2

INVENTOR.
JOSEPH C. BERNEY,

By Victor G. Laslo.
ATTORNEY.

FOLDABLE CASE SETUP APPARATUS

Original Filed Aug. 26, 1965 3 Sheets-Sheet 3

INVENTOR.
JOSEPH C. BERNEY,
By Victor G. Lesh
ATTORNEY.

United States Patent Office

Re. 27,631
Reissued May 1, 1973

27,631
FOLDABLE CASE SETUP APPARATUS

Joseph C. Berney, Corona Del Mar. Calif.
(174 La Verne Ave., Long Beach, Calif. 90803)

Original No. 3,435,738, dated Apr. 1, 1969, Ser. No. 482,801, Aug. 26, 1965. Application for reissue Mar. 29, 1971, Ser. No. 129,160
Int. Cl. B31b *1/80;* B65b *43/30*
U.S. Cl. 93—53 R 16 Claims

Matter enclosed in heavy brackets [ ] appears in the original patent but forms no part of this reissue specification; matter printed in italics indicates the additions made by reissue.

ABSTRACT OF THE DISCLOSURE

A case erecting apparatus includes a fed magazine which delivers a stack of knocked-down cases, an opening mechanism for sequentially opening the cases as they are removed from the stack, pivotal arms for closing the bottom end flaps at a station adjacent to magazine, and a transfer device which feeds a case with its bottom end flaps closed into a plow for closing the bottom side flaps. The opening mechanism includes a reciprocating suction device which grips the foremost panel of the front case in the stack and pulls it from the stack, fingers which momentarily restrain the rearmost panel of the front case to open the case, and stationary break plate in the path of the foremost end panel to shape the case to rectangular configuration. After the pivotal arms have closed the bottom end flaps, they serve as tracks to support those flaps while the transfer device moves the case into the plows. As additional features, a ram overfolds the bottom flaps, and an adhesive applicator may be used to seal the bottom flaps.

DETAILED DISCLOSURE

This invention relates to apparatus for setting up foldable cartons and more particularly to apparatus for opening flattened, foldable shipping containers into a rectangular shape and then folding their bottom flaps to a closed position.

Conventional foldable shipping containers of the rectangular four-flap type are typically manufactured from a single piece of cardboard, corrugated board, or the like, cut into a predetermined pattern and provided with indented fold lines to facilitate folding into a rectangular case. The manufacturer usually folds the cardboard pattern once to bring two opposite edges together and then joins these two edges, such as with a strip of adhesive tape for example, to thereby form what is commonly known as a "manufacturer's joint." When the case is set up for use, the manufacturer's joint is at a corner defined by the meeting of an end and a side of the case.

The case manufacturer ships the cases in this compact form, each case being a sheet of corrugated board folded in half and having the free ends joined by a manufacturer's joint. This compact folded configuration is designated in the art, and in the following specification and claims, by the term "knocked-down." Upon receipt by the user, each case must be set up by opening it to a rectangular shape and then folding the bottom flaps inwardly to a closed position. The bottom flaps are then typically maintained in the closed position by gluing, by a strip of gummed tape, or by stapling. The present invention is directed toward apparatus for setting up four-flap foldable cases of the type known as RSC (regular slotted containers), half telescope and the like.

The present invention apparatus includes various mechanisms which perform the major functions in setting up a foldable case, these major functions being opening the knocked-down case to a generally rectangular configuration, folding up the bottom end flaps, and folding up the bottom side flaps. The present invention apparatus can also include a mechanism for maintaining or securing the bottom flaps in the closed position. These mechanisms are functionally synchronized, rather than time synchronized. That is, the operation of the various components of the present invention apparatus is controlled by movement of the cases to various positions in the apparatus. Furthermore, unlike prior art case setup apparatus, the present invention apparatus does not turn the cases on a side or end while setting the case up and hence delivers the cases in upright orientation.

The present invention apparatus includes feeder means for maintaining a plurality of knocked-down cases in a stack, means for pulling the front side panel surface of the foremost case in the stack away from the feeder means while temporarily restraining the rear side panel surface of the case to thereby pop open the case into a tubular rectangular configuration, means for inwardly folding the bottom end flaps to a closed position, and means for then feeding the case into a plow which inwardly folds the bottom side flaps to the closed position. The present invention apparatus may also include adhesive application means for applying an adhesive substance to the inner surfaces of the bottom side flaps as these flaps are being folded to the closed position, and ram means for applying compressive pressure to the upper and lower surfaces of the formed bottom of the case. Alternatively, the present invention apparatus may include stapling means or tape application means for securing the bottom flaps to each other in the closed position. Or, in those applications wherein a bottom securing function is not desired in the present invention apparatus, the present invention apparatus may include means for overfolding the bottom flaps to break the bottom slightly inward in order to prevent the natural resiliency of the flaps from tending to slightly open the flaps upon the removal of the case from the machine.

Accordingly, it is an object of the present invention to provide improved foldable case setup apparatus.

It is also an object of the present invention to provide improved apparatus for setting up knocked-down cases of the four-flap top opening type.

It is another object of the present invention to provide foldable case setup apparatus which delivers the setup cases in upright orientation.

It is yet another object of the present invention to provide improved case setup apparatus of the described type which is capable of reliable operation at a high output rate.

It is a still further object of the present invention to provide a completely automatic case setup apparatus which is not programmed as a function of time.

It is still another object of the present invention to provide improved case setup apparatus in which synchronization is accomplished by the movement and positioning of cases passing through the apparatus.

It is a yet further object of the present invention to provide improved case set up apparatus wherein the setup cases may be held for release to downstream equipment in automatic synchronization with the need for cases by the downstream equipment.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for purpose of illustration and description only, and is not intended as a definition of the limits of the invention.

In the drawing:

FIGURE 1 is a plan view of a present invention case set-up apparatus with an upper portion cut away;

FIGURE 2 is a front elevation view of the apparatus of FIGURE 1;

The drawings show various views of a presently preferred embodiment of a case set-up apparatus utilizing the present invention concepts. For ease of explanation the machine may be functionally divided into a feeder mechanism A, a case opening mechanism B, a bottom end flap closing mechanism C, and a bottom side flap closing mechanism D. The description of these mechanisms will be preceded by a general description of the complete machine and followed by explanations of the control circuit and operating cycle.

GENERAL DESCRIPTION

Figure 3:
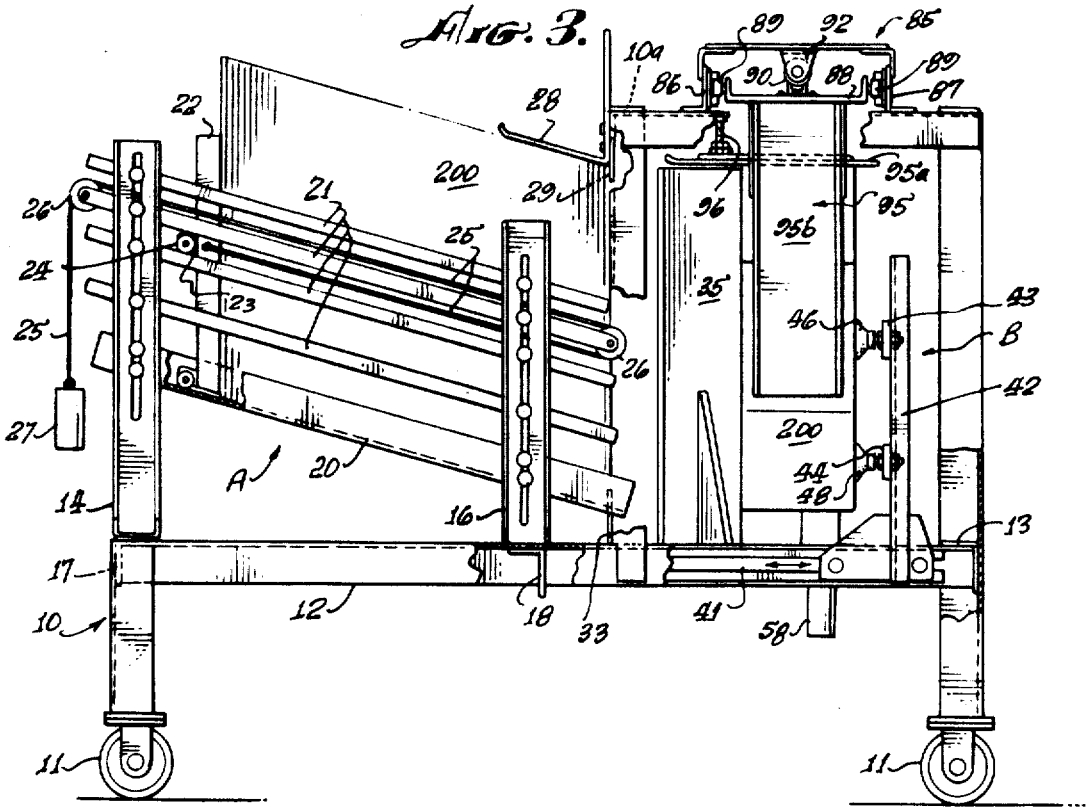
FIGURE 3 is a side elevation view of the apparatus of FIGURE 1.

The various mechanisms of the present invention apparatus are supported in the desired relationship by a framework, generally indicated by the reference numeral 10, as can best be seen in FIGURES 1, 2 and 3 of the drawing. The support framework 10 can conveniently be constructed of angle iron and rendered movable through the use of wheels 11. The framework 10 defines a right angle from the plan view, a pair of support bars 12 and 12a extending horizontally in one direction and another pair of support bars 13 and 13a extending horizontally at right angles therefrom. The feeder mechanism A is mounted to the projecting portions of the support bars 12 and 12a, the bottom side flap closing mechanism being mounted to the projecting portions of the support bars 13 and 13a, with the case opening mechanism B and the bottom end flap closing mechanism C being mounted at the base of the right angle.

The feeder mechanism A, which will be hereinafter described in detail, includes means for maintaining a plurality of identical knock-down cases in a stack, and means for continually urging the case toward a loading station L so that the foremost case in the stack will be at the loading station. Thus, when the foremost case is withdrawn from the stack, the next succeeding case will be presented to the loading station. The case opening mechanism B includes means for pulling the front side panel surface of the foremost case in the stack away from the loading station while momentarily restraining the rear side panel surface of the foremost case to thereby pop the case open, and means for guiding an end panel surface of the case so that the case will be opened to a rectangular configuration, the opened case then being presented to a bottom end flap closing station M. The bottom end flap closing mechanism C is disposed at the bottom end of flap closing station M, and includes means for individually closing each of the bottom end flaps of the case, these means also performing the additional function of providing a track for movement of the case away from the bottom end flap closing station. The bottom side flap closing mechanism D includes means for selectively moving the case away from the bottom end flap closing station, while maintaining the case in a rectangular configuration, and into plow means for closing the bottom side flaps of the case, the case then being presented to an output station N. In the illustrated embodiment, the bottom side flap closing mechanism D includes ram means disposed at the output station for over folding the bottom flaps to break the case bottom slightly inward. The illustrated embodiment also utilizes means for halting the machine operating cycle until the completely opened case is physically removed from the output station.

FEEDER MECHANISM

The feeder mechanism A defines a magazine for holding a stack of knock-down cases with the cases in substantially vertical alignment. The magazine is mounted to the support framework 10 by a pair of vertical support rods 14 at one of its ends and a pair of vertical support rods 16 at its other end. The rods 14 are longer than the rods 16 and are mounted to a crossbar 17 secured between the projecting ends of the support bars 12 and 12a. The vertical support rods 16 are secured to a cross bar 18 extending between intermediate portions of the support bars 12 and 12a. A pair of case supporting tracks 20, typically constructed of angle iron stock, are provided to support the cases in the magazine. One of the tracks 20 is secured to the vertical support rods 14 and 16 at one side of the apparatus, the other track 20 being secured to the vertical support rods 14 and 16 at the other side. A plurality of side guide bars 21 also extends between the vertical support rods on either side of the apparatus. The crossbars 17 and 18 and the vertical support rods 14 and 16 are slotted to thereby provide for adjustable mounting of the respective vertical support rods 14 and 16, and the tracks 20 and guide bars 21, to enable accommodation of case stacks of different sizes.

Referring now specifically to FIGURE 3, a pair of vertically oriented back stop bars 22 are provided to apply a continuous force to cases in the magazine, each of these back stop bars 22 riding on one of the case supporting tracks 20. Each of the back stop bars 22 is provided with a rearwardly extending flange 23 to which are mounted rollers 24, the rollers 24 riding on the guide bars 21. One end of each of a pair of elongate wires 25 is secured to a different one of the back stop bars 22. One of the guide bars 21 on each side of the apparatus is provided with a pair of pulleys 26 at either of its ends. Each of the wires 25 passes over the pair of pulleys 26 and hangs down vertically from the uppermost of the pulleys 26 in response to the force exerted by a weight 27. Thus, the back stop bars 22 are continually urged along the track, which is shown adjusted at an inclined angle.

A top guide plate 28 is vertically adjustably mounted to an uppermost portion 10a of the support framework 10 (see FIGURES 3 and 8), the plate 28 being bent to form an acute angle. The top guide plate 28 defines an elongate retaining finger 29 downwardly depending from its lowermost bent portion. Vertically adjustably mounted to an elongate support bar 31 is an upwardly projecting retaining finger 33. The function of the retaining fingers 29 and 33 is to restrain movement of the foremost case in the stack and retain it at the loading station L until the case is removed from the stack. The adjustment of the plate 28, together with a detailed explanation of functions of the retaining fingers will be hereinbelow explained.

CASE OPENING MECHANISM

The case opening mechanism B comprises a stationary break plate and a movable case positioning mechanism. The break plate is identified by the reference numeral 35 and is mounted so that it is vertically extending, and is provided at its lower end with a mounting plate 36 which is secured to a support bar 37 which extends horizontally between the crossbar 18 and the support bar 13. The break plate 35 defines a planar surface which is angularly inclined with respect to a stack of cases in the magazine.

The movable portions of the case opening mechanism B, the bottom end flap closing mechanism C and the bottom side flap closing mechanism D of the present invention apparatus are operated by air cylinders. Although the operation of the air cylinders is controlled, in the illustrated embodiment, by the use of electrically operated air valves, those skilled in the art will appreciate that various other control devices may be suitably employed.

A double-acting air cylinder 40 is mounted beneath the magazine defined by the feeder mechanism A in horizontal alignment between a pair of parallel tracks 31a and 32a by means of a pair of mounting brackets 38 and 39. Secured to the projecting end of the piston rod 41 of the air cylinder 40 is a slotted support bracket 42. The support bracket 42 is vertically oriented and its bottom end is provided with a pair of rollers 34 which ride on the tracks 31a and 32, thereby providing support and stability during movement. Adjustably secured to the support bracket 42 are a pair of transversely extending slotted cup support brackets 43 and 44. Adjustably mounted near opposite ends of the cup support bracket 43 are a pair of suction cups 46 and 47, a similar pair of suction cups 48 and 49 being adjustably mounted near opposite ends of the cup support bracket 44. The suction cups 46–49 are connected through suitable vacuum lines, not shown, to a central vacuum line 99 indicated schematically in FIGURE 5.

The air cylinder 40 is positioned so that when its piston rod 41 is in its full retracted position the suction cups 46–49 will be in substantially the same vertical plane as the retaining fingers 29 and 33 at the loading station. When the piston rod 41 is in its fully extended position a case held by the suction cups 46–49 will be positioned at the bottom end flap closing station M. When the piston rod 41 is retracted the suction cups contact the front side panel of the foremost case in a stack of cases in the magazine, and when the piston rod 41 is moved to its extended position the case is popped open to a rectangular configuration, as will be hereinbelow explained.

BOTTOM END FLAP CLOSING MECHANISM

The bottom end flap closing mechanism D comprises a pair of flap closers generally indicated by the respective reference numerals 50 and 60.

The flap closer 50 includes a double-acting cylinder 51 having a piston rod 52 and a crank arm 54. The air cylinder 51 is rotatably mounted to a support plate 53, which extends horizontally between one of the support bars 12 and the support bar 37. The crank arm 54 is rotatably mounted by securing it to a shaft 55 journalled within a pair of support brackets 56 mounted to the upper surface of an angle mounting bracket 57 which is secured to the support bar 37, as can best be seen in FIGURES 1 and 2. One end of a straight lever arm 58 is rigidly secured to the shaft 55 intermediate the brackets 56 whereby the lever arm 58 will rotate with the shaft 55. The projecting end of the piston rod 52 of the air cylinder 51 is rotatably secured to the free end of the crank arm 54. When the piston rod 52 is in its fully withdrawn position the lever arm 58 will extend downwardly in substantial vertical alignment, in the position shown in FIGURES 1–4. When the piston rod 52 is in its fully extended position the lever arm 58 will be in the horizontal position shown in FIGURE 7.

Figure 7:
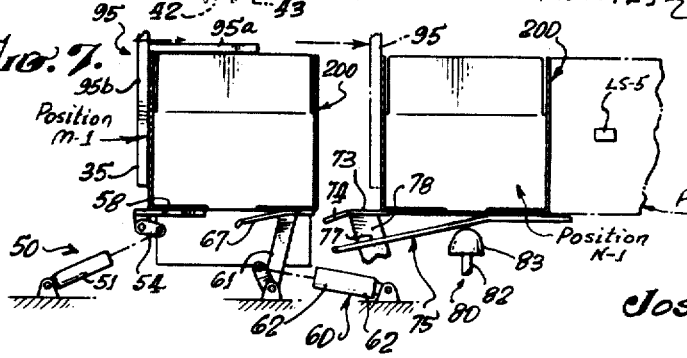
FIGURE 7 is a schematic elevation view of a case depicting operation of the bottom end flap closing mechanism.

The flap closer 60 includes a lever arm 61, a double-acting air cylinder 62 having a piston rod 63, and a crank arm 64. The crank arm 64 is rotatably mounted by rigidly securing it to a shaft 65 journalled within a pair of support brackets 66 secured to the upper surface of the support bar 32. The lever arm 61 is also rigidly secured to the shaft 65 for movement in unison with the shaft. The air cylinder 62 is rotatably mounted to the support bar 12a of the support framework 10. The projecting end of the piston rod 63 of the air cylinder 62 is rotatably secured to the free end of the crank arm 64. A generally rectangular closing plate 67 is angularly secured near one of its ends to the free end of the lever arm 61, this end of the closing plate 67 defining a bent end portion having a rectangular closing plate 67 is angularly secured near one of its ends to the free end of the lever arm 61, this end of the closing plate 67 defining a bent end portion having a rectangular notch 68 (see FIGURE 4). When the piston rod 63 is in its normally retracted position the lever arm 61 will be lowered to the position shown in FIGURE 2 and 4 of the drawing. When the piston rod 63 is in its fully extended position the lever arm 61 will be in an upright position so that the main body portion of the closing plate 67 will be substantially horizontal, as indicated in FIGURE 7. The flap closers 50 and 60 are selectively actuated to operate in a manner hereinbelow described to close the bottom end flaps of a case positioned at the bottom end flap closing station.

BOTTOM SIDE FLAP CLOSING MECHANISM

The bottom side flap closing mechanism D comprises guide means generally indicated by the reference numeral 70 and including a plow 75, ram means positioned at the output station and generally indicated by the reference numeral 80, and a case transport mechanism generally indicated by the reference numeral 85 for moving the case from the bottom end flap closing station through the plow 75 and to the output station.

The function of the guide means 70 is to guide a case, after its bottom end flaps have been closed, from the bottom end flap closing station to the output station, while folding the bottom side flaps to a substantially closed position. A pair of upper guide bars 71 and a pair of lower guide bars 72 are mounted to an upstanding portion of the support framework 10 at the right hand side of the framework as viewed in FIGURES 1 and 2, all of the guide bars 71 and 72 being mounted in horizontal alignment. One set of guide bars 71 and 72 is mounted above the support bar 13, while the other set of guide bars 71 and 72 are mounted over the support bar 13a. The sets of guide bars 71 and 72 are mounted to the support framework 10 by laterally adjustable means, not shown, whereby the spacing between the sets of guide bars can be adjusted for different size cases. The ends of the guide bars 71 and 72 closest to the bottom end flap closing station are bent slightly outwardly, as can best be seen in FIGURE 4, in order to assist in feeding the box between the sets of guide bars. The plow means 75 comprises a pair of elongate bars, 76 and 77, disposed in horizontal alignment between and below the pairs of guide bars 72. Each of the plow rods 76 and 77 defines a respective skewed end portion 76a and 77a which extend angularly downward and away from the main body portion of these plow rods. The plow rods 76 and 77 are mounted to the framework 10 by the same adjustable mounting means for the guide bars 71 and 72, whereby the plow bars will move in unison with the guide bars 71 and 72 when adjusting the guide means 70 for a different case size.

The function of the skewed end portions 76a and 77a of the respective plow bars 76 and 77 is to inwardly fold the bottom side flaps of a case as it is urged into the guide means by the case transport mechanism, the main body portions of the plow bars 76 and 77 then supporting the bottom of the set-up case. As a case is fed into the guide means 70 the case bottom is defined by the inwardly folded bottom end flaps, the case bottom being supported by the bottom end closers 58 and 67 which are in their horizontal positions, then by a support plate 73. The support plate 73 is maintained by a mounting foot 78 in a position between the skewed end portions 76a and 77a of the plow rods and on the same horizontal plane as the main body portions of the plow rods. The support plate 73 defines a downwardly curved projecting tab 74 at its foremost end (see FIGURE 4), the tab 74 being slightly smaller than the rectangular notch 68 in the closing plate 67.

The ram means 80 comprises a double-acting air cylinder 81 having a truncated cone 83 mounted to the projecting end of its piston rod 82. The air cylinder 81 is mounted in vertical orientation by means of a vertically adjustable mounting bracket 84 to a crossbar 19 extending horizontally between the support bars 13 and 13a, the position of the ram means on the crossbar 19 being longitudinally adjustable, such as by slots in the mounting bracket 84, for example. The ram means 80 is adjusted so that the apex of the cone 83 is slightly below the main body portion of the plow bars 76 and 77 when the piston rod 82 is in the fully withdrawn position shown in FIGURE 7, the longitudinal positioning of the ram means 80 on the crossbar 19 being such as to position the cone midway between the front and rear side panels of a case fed into the guide means.

The case transport mechanism 85 includes movable carriage means supported by a pair of carriage tracks 86 and 87 mounted in parallel alginment atop the support framework 10, as can best be seen in FIGURE 3. A carriage 88 is mounted by means of rollers 89 for movement along the carriage tracks. A double-acting air cylinder 90 having a piston rod 91 is rigidly mounted above and between the carriage tracks 86 and 87 by means of mounting assemblies 92 and 93. The carriage 88 is secured to the projecting end of the piston rod 91 for movement in response to the switching of air to the air cylinder 90 in a manner to be hereinafter explained.

A pusher plate means 95 is provided in the form of a right angle, defining an upper horizonal plate 95a and a lower vertical plate 95b. The horizontal plate 95a is mounted to the carriage 88 by means of mounting bolts 96 and 97. The mounting bolts 96 and 97 are fairly long and are provided with stop nuts at their upper end to thereby allow vertical adjustment of the horizontal plate 95a to accommodate various case heights.

When the piston rod 91 of the air cylinder 90 is in its fully retracted position, as shown in FIGURE 2, the pusher plate means 95 is positioned at the bottom end flap closing station with the vertical plate 95b in position to support the left side panel of a case at the bottom end flap closing station M. Upon movement of the piston rod 91 to its fully extended position, a case at the closing station M is pushed into the guide means 70 and to the output station N, in a manner to be hereinabove explained.

CONTROL CIRCUIT

Synchronized actuation of the various air cylinders in the illustrated embodiment is accomplished through the use of six limit switches, indicated by the reference characters LS–1 through LS–6. The locations of the various limit switches are shown in FIGURES 1 and 2 of the drawing. Switch LS–1 has two sets of contacts, one set being normally open and the other set being normally closed, and is positioned at the loading station L in such a manner that the switch will be actuated by the case positioning mechanism when the piston rod 41 of the air cylinder 40 is in its fully withdrawn position wherein the case positioning mechanism is at the loading station. The switch LS–2 also has two sets of contacts, one set being normally open and the other set being normally closed, and is positioned so that this switch is actuated by the case positioning mechanism when the piston rod 41 is in its fully extended position. Switches LS–1 and LS–2 are shown in FIGURE 1 of the drawing, the switches LS–3 and LS–4 being shown in FIGURE 2 of the drawing. LS–3 is a normally open switch, having only one set of contacts, disposed beneath the air cylinder 90 in such a position that the switch will be closed by the carriage 88 when the piston rod 91 of the air cylinder 90 is in its full withdrawn position wherein the pusher plate is located at the bottom end flap closing station M. LS–4 is a normally closed switch, having only one set of contacts and is disposed above the guide means 70 and arranged so that the carriage 88 will open the switch when the piston rod 91 reaches its fully extended position, whereupon the pusher plate has moved the case from the bottom end flap closing station M to the output station N.

Switch LS–5 is a normally closed switch, and is mounted at the side of the guide means 70 in such a position that a case positioned at the output station will open the switch. Switch LS–5 is shown in FIGURES 1 and 2 of the drawing, while switch LS–6 has two sets of contacts, one set being normally open and the other set being normally closed, the switch being mounted to the supporting framework 10 adjacent the flap closer 70 so that the switch will be actuated by the flap closer 60 when the piston rod 63 of the air cylinder 62 is in its fully extended position.

Figure 5:
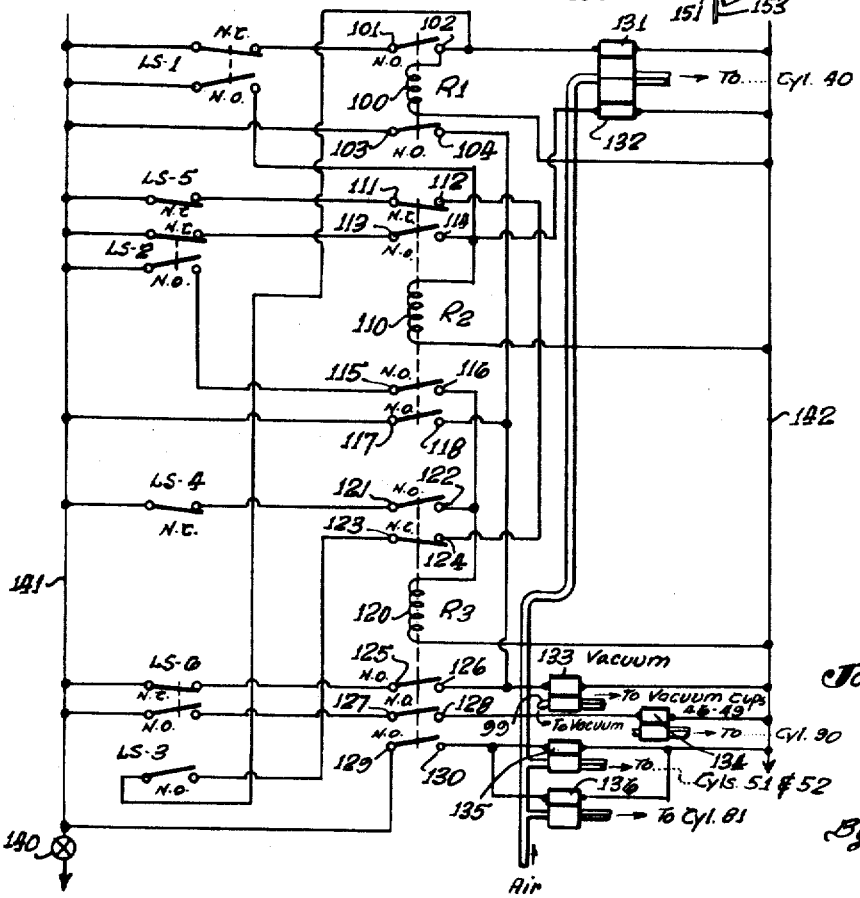
FIGURE 5 is an electrical schematic diagram of the control circuit for the apparatus of FIGURE 1.

Referring now to FIGURE 5 of the drawing there is shown an exemplary electrical circuit for use with the illustrated embodiment. Electrical switching is accomplished by the limit switches and three relays indicated by reference symbols $R_1$, $R_2$ and $R_3$. The relay $R_1$ is a double-pole single-throw relay having a relay coil 100, a set of normally open contacts with terminals 101 and 102, and a second set of normally open contacts with terminals 103 and 104. The relay $R_2$ is a four-pole single-throw relay having a relay coil 110, a set of normally closed contacts with terminals 111 and 112, a first set of normally open contacts with terminals 113 and 114, a second set of normally open contacts with terminals 115 and 116, and a third set of normally open contacts with terminals 117 and 118. The third set of relay contacts having terminals 115 and 116 are coupled to an "off" delay timer which functions to maintain this set of contacts in the closed condition for an adjustable short period of time after de-energization of the relay coil 110. This timing device is incorporated in the relay structure and is readily commercially available. The relay $R_3$ is a five-pole single-throw relay having a relay coil 120, a first set of normally open contacts with terminals 121 and 122, a set of normally closed contacts with terminals 123 and 124, a second set of normally open contacts with terminals 125 and 126, a third set of normally open contacts with terminals 127 and 128, and a fourth set of normally open contacts with terminals 129 and 130. The third normally open set of contacts with terminals 127 and 128 are coupled to an "off" delay timer incorporated in the relay.

Air switching is accomplished by five solenoid air valves. A five-way three-position double-solenoid air valve with all ports blocked in a de-energized state and having solenoids 131 and 132 is provided for the selective switching of air to the air cylinder 40, energization of the solenoid 131 causing movement of the piston rod 41 toward its extended position, and energization of the solenoid 132 causing movement of the piston rod 41 toward its retracted position. An air valve having a solenoid 133 is provided for the selective application of vacuum to the suction cups 46–49. An air valve having a solenoid 134 is provided for the selective switching of air to the cylinder 90. An air valve having a solenoid 135 is provided for the selective switching of air to the cylinders 51 and 52, and another air valve having a solenoid 136 is provided for the selective switching of air to the cylinder 81.

A pair of bus bars 141 and 142 are connected to a suitable source of electrical current through an on-off switch 140. One end of the relay coil 100 of the relay $R_1$ is connected to the bus bar 142, the other end of the relay coil being coupled to the bus bar 141 through two possible paths. The first possible path is traceable through the contact terminals 101 and 102 and the normally closed contacts of the limit switch LS–1. The second possible path is traceable through the limit switch LS–3, the contact terminals 123 and 124 of the relay $R_3$, the contact terminals 112 and 111 of the relay $R_2$, and the limit switch LS–5. One end of the relay coil 110 of the relay $R_2$ is connected to the bus bar 142, the other end of the relay coil 110 being coupled to the bus bar 141 through two possible paths. The first possible path is traceable through the contact terminals 114 and 113 of the relay $R_2$, and through the normally closed set of contacts of the limit switch LS–2. The other possible path is traceable through the normally open set of contacts of the limit switch LS–1.

One end of the relay coil 120 of the relay $R_3$ is connected to the bus bar 142, the other end of the relay coil 120 being coupled to the bus bar 141 through two possible paths. The first possible path is traceable through the contact terminals 122 and 121 of the relay $R_3$, and through the limit switch LS–4. The other possible path is traceable through the contact terminals 116 and 115 of the relay $R_2$, and through the normally open set of contacts of the limit switch LS–2.

The solenoid 131 is connected between the bus bar 142 and the contact terminal 102 of the relay $R_1$, whereby the solenoid 131 is effectively in parallel with the relay coil 100. The solenoid 132 is connected between the bus bar 142 and the contact terminal 114 of the relay $R_2$, whereby the solenoid 132 is effectively connected in parallel with the relay coil 110. One end of the solenoid 133 is connected to the bus bar 142, the other end of the solenoid being coupled to the bus bar 141 through three possible paths. The first possible path is traceable through the contact terminals 126 and 124 of the relay $R_3$, and through the normally closed set of contacts of the limit switch LS–6. The second possible path is traceable through the contact terminals 118 and 117 of the relay $R_2$. The third possible path is traceable through the contact terminals 104 and 103 of the relay $R_1$.

One end of the solenoid 134 is connected to the bus bar 142 the other end of the solenoid being coupled to the bus bar 141 through a path traceable through the contact terminals 128 and 127 of the relay $R_3$, and through the normally open set of contacts of the limit switch LS–6. The solenoids 135 and 136 are electrically connected in parallel, one end of these solenoids being connected to the bus bar 142, with the other end of these solenoids being coupled to the bus bar 141 through a path traceable through the contact terminals 130 and 129 of the relay $R_3$.

OPERATING CYCLE

Figure 6:
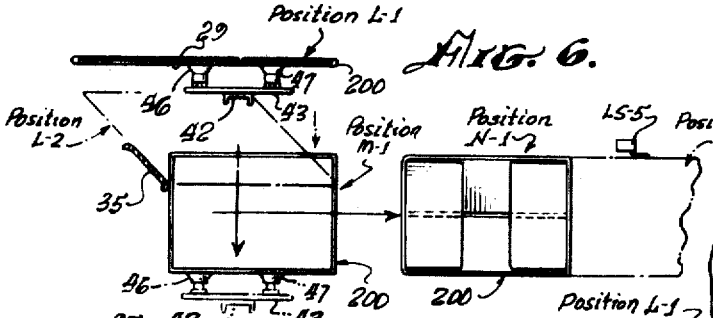
FIGURE 6 is a schematic plan view depicting changes in the configuration of a case as it passes through the apparatus of FIGURE 1.
Figure 8:
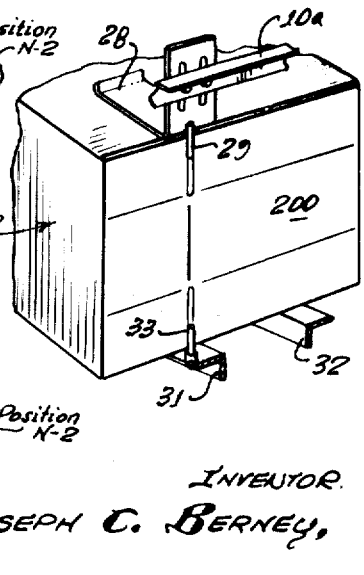
FIGURE 8 is a pictorial view depicting the interrelationship between certain components in the apparatus of FIGURE 1.
Figure 4:
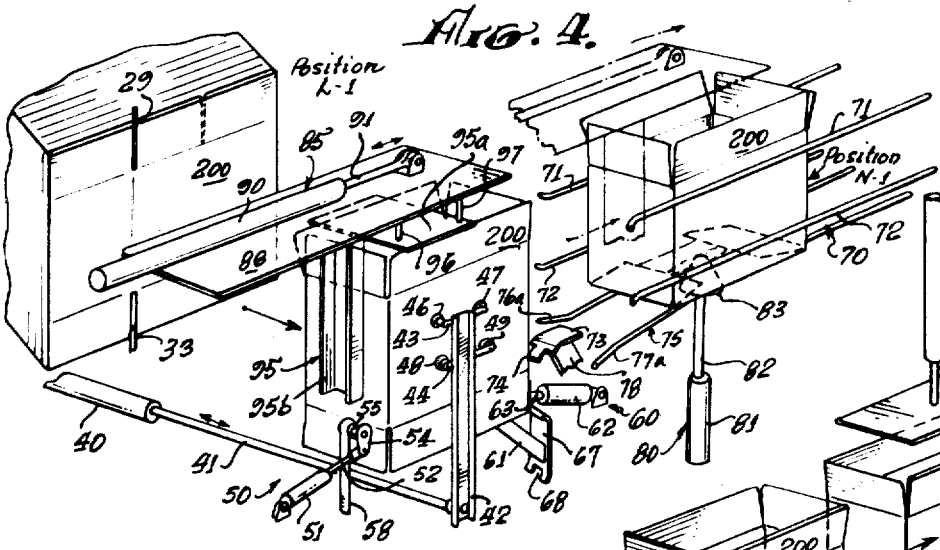
FIGURE 4 is a pictorial view depicting changes in the configuration of a case as it passes through the apparatus of FIGURE 1.

The operating cycle of the illustrated embodiment of the present invention apparatus will be described by tracing the passage of a case 200 through the apparatus. FIGURES 4, 6 and 8 show the case 200 at different positions in the apparatus, these positions being identified by reference symbols which are correlated with the various stations in the apparatus. The starting position of the case 200 at the loading station is identified by the reference symbol L–1. Before reaching the bottom end flap closing station the case passes through an intermediate position identified by the reference symbol L–2. Succeeding positions of the case are identified by the respective reference symbols M–1, N–1 and N–2.

To prepare the apparatus for operation the magazine of the feeder mechanism A is loaded with a plurality of knocked-down cases which are inserted in the magazine so that they are all vertically oriented and aligned in the same direction. In the illustrated embodiment the cases 200 are aligned in such a direction that the forwardmost panel of the case has the end fold line at the left, whereby the case will be presented to the position L–1 as shown in FIGURES 4 and 8. Upon loading the magazine with a suitable number of knocked-down cases a substantially horizontally extending stack of vertically oriented cases is formed with the foremost case in the stack at the starting position L–1 at the loading station L. In setting up the apparatus for the particular size case to be used, the spacing between the side guide bars 21 is determined by the overall width of the knocked-down cases, the actual positioning of the side guide bars 21 being such as to bring the slots in the foremost panel of the cases into register with the retaining fingers 29 and 33. The case supporting tracks 20 are vertically adjusted to present the cases to the starting position L–1 so that the bottom fold lines of the cases (which will be at the case bottom when the bottom flaps are subsequently closed) will be at the same height as the guide bed formed by the lever arm 58 and closing plate 67 when in their uppermost horizontal positions, the support plate 73 and the main body portions of the plow rods 76 and 77. The top guide plate 28 is vertically adjusted in accordance with the overall height of the knocked-down cases.

As stated hereinabove, the weights 27 result in a pushing force on the stack of cases in the magazine, this pushing force continually urging the cases toward the loading station. The foremost case in the stack will be in the starting position L–1 and is retained in the stack by the retaining fingers 29 and 33 which are in contact with the rearmost panel of the first knocked-down case in the stack.

When the case 200 is in the starting position L–1, assuming that there are no cases at the closing station M or at the output station N, the operational components of the apparatus are in their normal rest positions. In the normal rest position air pressure is applied to the head end of the air cylinder 40 so that its piston rod 41 is in the fully extended position, as indicated in FIGURES 3 and 4, whereby the suction cups 46–49 are spaced a maximum distance away from the loading station. In the normal rest position air pressure is applied to the rod ends of the air cylinders 51 and 62 so that the flap closers 50 and 60 are in their respective lowermost positions as indicated in FIGURES 1, 2 and 4. In the normal rest position air pressure is applied to the head end of the air cylinder 81 whereby the cone 83 will be in its uppermost position shown in FIGURES 2 and 4. Air pressure is applied to the rod end of the air cylinder 90 when the apparatus is in the normal rest position, so that the piston rod 91 is fully withdrawn and the carriage 88 is positioned at the closing station, as indicated in FIGURES 2, 3 and 7, and by the dark line position shown in FIGURE 4. when the carriage 88 is in this position, the limit switch LS–3 is actuated to the closed condition.

To begin machine operation the on-off switch 140 is closed, thereby resulting in energization of the relay $R_1$ and the actuation of the solenoid 131 through the closed contacts of the limit switches LS–3 and LS–5. Actuation of the solenoid 131 results in a switching of the air to the air cylinder 40 to cause retraction of its piston rod 41 to thereby move the suction cups 46–49 toward the foremost case in the stack. Energization of the relay $R_1$ causes this relay to be locked in through the normally closed set of contacts of the switch LS–1, and also causes actuation of the solenoid 133 to result in the application of vacuum to the suction cups 46–49. When the piston rod 41 reaches its full retracted position the suction cups 46–49 are brought into contact with the foremost case 200 in the stack at the position L–1, and the limit switch LS–1 is actuated (see FIGURE 1 and the dark line portions of FIGURE 6).

Actuation of the limit switch LS–1 results in the deenergization of the relay $R_1$ (which had been locked on through its contact terminals 101 and 102) and the deactuation of the solenoid 131. Actuation of the limit switch LS–1 also causes energization of the relay $R_2$ and actuation of the solenoid 132 to again switch the air to the air cylinder 40 and return the piston rod 41 to its extended position and the case opening mechanism to its normal rest position. Energization of the relay $R_2$ keeps the vacuum on since the solenoid 133 now remains energized through the contact terminals 117 and 118. Closing of the contacts between the terminals 115 and 116 upon energization of the relay $R_2$ primes the relay $R_3$ for energization when LS–2 closes. Closing of the contacts between the terminals 113 and 114 locks in the relay $R_2$ and the solenoid 132.

As the case opening mechanism returns toward the closing station M the foremost panel of the case 200 is pulled away from its rearmost panel, the foremost panel being secured by vacuum to the suction cups 46–49 and the rearmost panel being restrained at the loading station by the retaining fingers 29 and 33. The vertical adjustments of the retaining fingers 29 and 33 are such that only about one-quarter inch of the tips of these fingers contact the cases 200, whereby the cases can be pulled free of the retaining fingers upon the slight rearward bending of the top and bottom edge portions of the rearmost panel. Thus, as the foremost panel of the case is pulled away from the loading station the retaining fingers 29 and 33 momentarily restrain the rearmost panel at the loading station, until the pulling force transmitted from the foremost panel to the rearmost panel becomes sufficiently great to cause rearward bending of the top and bottom side flap portions sufficiently to pull the panel free from the retaining fingers. Upon being pulled free, the case is held only by its foremost panel, which is secured by vacuum to the suction cups 46–49. The position of the case just after it is pulled free from the retaining fingers is designated as the intermediate position L–2, as indicated by phantom lines in FIGURE 6 of the drawing.

Further, movement of the suction cups 46–49 through continued extension of the piston rod 41, brings the left hand portion of the foremost panel surface of the case into contact with the break plate 35, which exerts a lateral force on the end surface of the case to cause the case to be fully opened into a rectangular configuration as the partially opened case is pulled past the break plate. Note from FIGURE 1 of the drawing that the retaining fingers are in substantial alignment with the foremost edge of the breaker plate 35 so that as a case is pulled by the breaker plate the foremost edge will cause the case to be squared up. Thus, the case arrives at the bottom end flap closing station (position M) in a tubular rectangular configuration.

As the piston rod 41 was extended to pop open the case, the limit switch LS–1 was de-actuated. However, relay $R_2$ and solenoid 132 remain energized since they are locked in through the set of $R_2$ relay contacts with terminals 113 and 114. When the case 200 reaches the position M–1 at the closing station M upon full extension of the piston rod 41, the limit switch LS–2 is actuated. Opening of the normally closed contacts of the switch LS–2 results in de-energization of the relay $R_2$ and the solenoid 132 since the aforementioned lock-in circuit is interrupted, and the piston rod 41 is maintained in the extended position. Upon de-energization of the relay $R_2$ the normally open contacts between the terminals 115 and 116 remain closed for a short period of time due to the time delay mechanism associated with this contact. Thus, closing of the normally open set of contacts of the limit switch LS– results in energization of the relay $R_3$, which immediately locks itself on by closure of the set of contacts between the terminals 121 and 122, the circuit path being completed through the normally closed limit switch LS–4. Energization of the relay $R_3$ also prevents energization of the relay $R_1$ due to the opening of the normally closed set of contacts between the terminals 123 and 124. Closing of the relay contacts between the terminals 125 and 126 holds on the vacuum even though the relay $R_2$ is being de-energized. Closing of the relay contacts between the terminals 127 and 128 primes the solenoid 134 for actuation upon the later actuation of the limit switch LS–6.

Closing of the relay contact between the terminals 129 and 130 results in energization of the solenoids 135 and 136 to switch the air to the air cylinders 51, 62 and 81. Switching of air to the head end of the air cylinder 51 causes extension of the piston rod 52 and rotation of the lever arm 58 in a counter-clockwise direction from its lowered position as shown in FIGURE 2 to a raised position in which it is substantially horizontal, as shown in FIGURE 7 of the drawing. With the case 200 at the position M its bottom end flap on its left hand side is in contact with the lever arm 58, whereby rotation of the lever arm 58 to its horizontal position will cause this bottom end flap to be folded inwardly to the fully closed horizontal position shown in FIGURE 7.

The application of air to the head end of the air cylinder 62 causes extension of its piston rod 63, thereby resulting in counter-clockwise rotation of the lever arm 61 and flap closing plate 67 from the lowermost position shown in FIGURE 2, to an uppermost position wherein the end portion of the closing plate 67 is in substantially horizontal alignment, as shown in FIGURE 7. The arcuate movement of the closing plate 67 upon rotation of the lever arm 61 brings the projecting end of the closing plate into contact with the bottom end flap on the right hand side of the case 200 causing this flap to be rotated inwardly to its fully closed horizontal position. As the closing plate 67 moves to the horizontal position it passes quite closely to the foremost end of the support plate 73, the rectangular notch 68 in the closing plate 67 providing clearance for the projecting tab 74 of the support plate 73. Thus, when the lever arm 58 and the closing plate 67 are in their horizontal positions they are almost touching each other to provide, in conjunction with the support plate 73, a track or portion of a bottom guide bed for the case which now has its bottom end flaps folded to their closed position. The plate 95a on carriage 88 prevents upward movement of the case in response to the forces exerted by the operation of the flap closers 58 and 67.

Switching of air to the head end of the cylinder 81 lowers the cone 83 on the piston rod 82 to the lowermost position shown in FIGURE 7 to remove it from the path of a case entering the guide means 70.

As the piston rod 63 of the air cylinder 62 reaches its fully extended position, wherein the closing plate 67 reaches horizontal alignment, the lever arm 61 actuates the limit switch LS–6. Opening of the normally closed set of contacts of the switch LS–6 interrupts the vacuum to the suction cups 46–49; however, the case 200 is supported in the position M–1 by the horizontally aligned lever arm 58 and closing plate 67. Closing of the normally open set of contacts of the switch LS–6 results in energization of the solenoid 134 by completion of the electrical circuit through the terminals 127 and 128 of the energized relay $R_3$. Energization of the solenoid 134 results in the application of air to the head end of the air cylinder 90 to cause extension of its piston rod 91 and movement of the carriage 88 from the closing station M to the output station N. In the normal rest position the vertical plate 95b of the pusher plate means 95 is adjacent the left end panel of the opened case which is at the position M–1. The horizontal plate 95a of the pusher plate means is vertically adjusted so as to be only slightly above the uppermost edge surface of the opened case. As the piston rod 91 begins extending to move carriage 88 and the pusher plate 95 means toward the right in the view of FIGURE 2, the vertical plate 95b contacts the left end panel of the opened case and begins to push the case to the right, the closed bottom end flaps of the case sliding along the horizontal surface defined by the contiguous lever arm 58, closing plate 67 and the support plate 73.

The skewed end portions 76a and 77a of the plow bars 76 and 77 project outside of the still open bottom side flaps of the case so that as the case is pushed toward the output station the bottom side flaps of the case will contact these skewed portions and be folded inward as the case moves into the plow 75. The horizontal plate 95a of the pusher plate means 95 restrains the case from tending to rise in response to the force exerted on the case by the plow 75, the guide bars 71 and 72 of the guide means 70 preventing rotation of the case and constraining movement of the case to a linear path. The horizontally aligned main body portions of the plow bars 76 and 77 are in the same horizontal plane as the support plate 73, so that there is no vertical movement of the case itself during its passage from the position M–1 to the position N–1. Thus, as the case is fed into the plow means its bottom side flaps are folded inwardly and the case is supported at the output station by the plow bars 76 and 77.

When the carriage 88 is in its normal rest position, as shown in FIGURE 2 of the drawing, a projection on the carriage contacts the limit switch LS–3 and maintains it in the actuated condition. As the carriage begins to move toward the right upon extension of the piston rod 91 the limit switch LS–3 opens, to thereby prevent re-energization of the relay $R_1$ until the carriage returns to its normal rest position. When the piston rod 91 reaches its fully extended position whereupon the pusher plate means 95 has moved the case into position N–1, wherein the case is directly above the cone 83, the carriage causes actuation of the limit switch LS–4, thereby opening its normally closed contacts. Opening of the switch LS–4 causes de-energization of the relay $R_3$, de-energization of the relay $R_3$ resulting in the switching of air to the air cylinders 51, 62 and 81 to return these cylinders to their normal rest positions. Thus, the lever arm 58 and the closing plate 67 are lowered and the cone 83 is brought upward due to extension of the piston rod 82.

As the cone 83 moves upward in response to the application of air to the head end of the air cylinder 81, it contacts the closed bottom side flaps of the set-up case in position N–1 at the output station, further upward movement of the cone pushing the bottom side flaps upward to over-bend them. In the illustrated embodiment the cases 200 may have angularly scored bottom flaps so that when the bottom flaps are over-folded the bottom is broken slightly inward in order to prevent the natural resiliency of the bottom side flaps from tending to partially reopen the flaps upon removal of the case from the machine, whereupon the case would no longer stand upright but would tilt to one side. When the piston rod 82 is in its fully extended position the cone 83 will be in the uppermost position indicated in FIGURES 2 and 4. The horizontal plate 95a of the pusher plate means 95 keeps the case from tending to move upwardly in response to the pushing force of the rising cone 83.

Breaking of the electrical contact between the terminals 127 and 128 upon de-energization of the relay $R_3$ results in the de-energization of the solenoid 134, the de-energization being slightly delayed due to the time delay mechanism associated with this particular set of contacts of the relay $R_3$. Upon this slightly delayed de-energization of the solenoid 134, the air to the cylinder 90 is again switched to cause withdrawal of the piston rod 91 to return the carriage 88 to its normal rest position at the bottom end flap closing station M. The reason for this slight delay is to insure that the pusher plate means 95 is firmly holding the case at the output station while the cone 83 of the ram means 80 is moving upward to slightly break the bottom of the case.

As the carriage 88 begins moving back to its normal rest position it de-actuates the limit switch LS–4 to allow it to return to its normally closed condition to again prime lock-in of the relay $R_3$ for the next cycle of operation. Upon reaching the normal rest position the carriage 88 again actuates the limit switch LS–3. If at this time there is no case at the position N–2 of the output station, the limit switch LS–5 will automatically begin another cycle of machine operation. The cone 83 remains in its uppermost position until the relay $R_3$ is again energized when the next succeeding case is brought to the closing station M. As the next succeeding case is moved into the position N–1 by the pusher plate means 95 this case pushes the preceding case from the position N–1 to the position N–2 (see FIGURE 6) where the preceding case actuates the limit switch LS–5 to an open condition to thereby prevent initiation of another operating cycle until this preceding case is removed from the apparatus. The means removing the cases from position N–2 at the output station of the apparatus is not a part of the present invention and is not shown. However, the cases can be either manually removed or automatically removed by other apparatus.

BOTTOM SECURING MECHANISM

Figure 9:
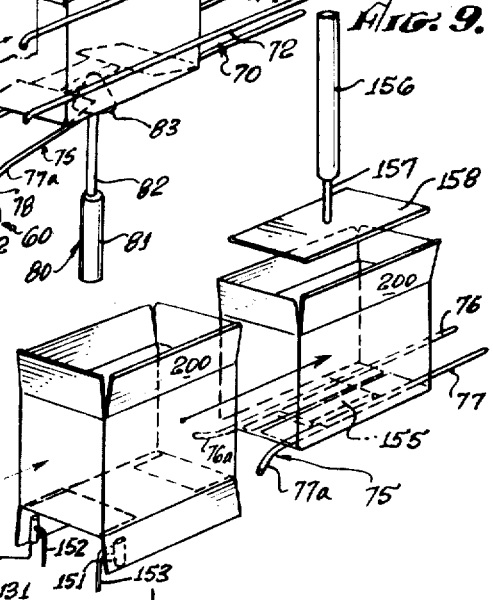
FIGURE 9 is a pictorial view showing an alternative embodiment of a portion of the apparatus of FIGURE 1.

Turning now to FIGURE 9 of the drawing, there is shown, as an alternative to the ram means 80, a technique for automatically gluing the bottom flaps of a case as it passes through the apparatus. To utilize this technique it is necessary to provide a greater physical separation of the bottom side flap closing mechanism from the bottom end flap closing mechanism than is shown in FIGURES 1, 2 and 3. It is necessary to provide a space of at least the length of a case between the stations M and N (between the case positions M–1 and N–1) for the addition of a glue application station. A pair of glue applicators 150 and 151 are provided to apply glue to the inwardly facing surfaces of the bottom side flaps of the case as it passes through the glue application station in response to movement of the carriage 88. The glue applicators 150 and 151 are supplied with liquid glue through feeder hoses 152 and 153, the feeder hoses being connected to a suitable pressurized source of glue, not shown. Suitable types of glue applicators are well known in the art, and hence will not be discussed in detail beyond stating that it is presently preferred to use those types of applicators which are controllable to selectively eject glue in response to a control signal.

As the case clears the glue applicators 150 and 151 it immediately enters the plow 75 which folds the bottom side flaps to a closed position. A bottom plate 155 is provided between the plow bars 76 and 77 so as to be directly under the bottom of a set up case presented to the output station N. An air cylinder 156 is vertically disposed above the output station so as to be centered over a case at the position N–1. The air cylinder 156 has a piston rod 157 which extends downwardly and to the projecting end of which is secured a pressure plate 158. The pressure plate 158 is horizontally disposed and is of slightly smaller dimensions than the interior of the cases 200 so that the pressure plate can fit into the case. In the normal rest position the piston rod 157 is fully withdrawn so that the pressure plate 158 is held above a case in position N–1. The operation of the air cylinder 156 can be synchronized with the operation of the air cylinder 90 so that upon the withdrawal of the carriage 88 after positioning a case at the output station, the piston rod 157 will extend to bring the pressure plate down into the case at the output station. At the fully extended position of the piston rod 157 the pressure plate 158 is in pressure contact with the bottom of a case at the output station, pressing against the resistance of the plate 155 to compress the bottom flaps of the case to a substantially planar and horizontal configuration during setting of the glue on the flap bottom. The pressure plate 158 and/or bottom plate 155 may be heated so that when thermal setting glue is utilized the bottom flaps will be glued in a matter of seconds, whereupon the air cylinder 156 can be automatically returned to its normal rest position so that the fully set-up case may be removed from the apparatus.

Thus, there has been described novel apparatus for setting up knocked-down cases of the 4-flap type, the apparatus being synchronized by the movement and positioning of cases passing through the apparatus. Although the invention has been described with a certain degree of particularity, it is understood that the present disclosure has been made only by way of example and that numerous changes in the details of construction and the combination and arrangement of parts may be resorted to without departing from the spirit and scope of the invention as hereinafter claimed. For example, although in the illustrated embodiment the case feeder mechanism utilizes an inclined track and a system of weights to urge the cases to the loading station, a level chain drive, or the like, could be used, with the cases being urged by friction or by dog hooks. In short, any type of feed mechanism can be utilized to present a sequential series of knocked-down cases to the loading station, in identical, substantially vertical orientation. Also, although in the illustrated embodiment the limit switch LS–5 is positioned at the output station of the apparatus so that the next cycle of machine operation will not begin until a setup case is removed from the output station, the limit switch LS–5 could alternatively be located in other equipment located downstream from the present invention apparatus, and be used in conjunction with equipment for automatically removing setup cases from the present invention apparatus, whereby discharge of cases from the present invention apparatus can be synchronized with the operation of the other equipment. Furthermore, in setting up certain cases it might not be necessary to temporarily restrain the rearmost panel of a case at the loading station, contact of the case with the break plate as the case is being pulled by it being sufficient to pop the case open. And in some applications even the break plate might be unnecessary, mere movement of the foremost case panel being sufficient to pop the case open.

What is claimed is:

1. Case setup apparatus for rectangular foldable corrugated cases each having a pair of end panels and a pair of larger side panels, the cases being received in a knocked-down configuration with one end and side panel forward and the other end and side panel rearward and flat against the foremost panel, comprising:

(a) feeder means for maintaining a plurality of said knocked-down cases in a stack wherein the cases are identically vertically oriented with their bottom flaps lowermost, said feeder means including means for continually urging said stack toward a loading station with a predetermined force;

(b) first and second elongate retaining members fixedly mounted one above the other in vertically opposing alignment at said loading station, said first member depending downwardly in register with the uppermost vertical slot in the foremost panel of said cases and in the path of the top flap of the rear side panel, said second member projecting upwardly in register with the lowermost vertical slot in the foremost panel of said cases and in the path of the bottom flap of the rear side panel, said retaining members being smaller than said slots so that the foremost panel of the foremost case in said stack will freely pass by said retaining members and the rear side panel will be restrained by said retaining members;

(c) a reciprocating member selectively movable perpendicular to the panel surfaces of the cases in said stack between a first position at said loading station and a second position away from said loading station, said reciprocating member having a vacuum cup mounted for engagement with the foremost side panel opposite the retained side panel of the foremost case in said stack when said reciprocating member is at said first position to secure said foremost side panel thereto, said second position being spaced from said first position a sufficient distance so that upon movement of said reciprocating member from said first position to said second position the foremost case in said stack will be pulled open into a tubular configuration and its rearmost panel pulled free from said retaining members, said vacuum cup being selectively disengageable from the foremost side panel of said case when said reciprocating member is at said position;

(d) means for inwardly folding the bottom end flaps of said case to a substantially closed position; and (e) means for then feeding said case into closing means operable to fold the bottom side flaps of said case to a substantially closed position.

2. Case setup apparatus in accordance with claim 1 and further comprising:

ram means disposed at an output station, said ram means including an upwardly projecting substantially conical member selectively movable from a lowered position beneath the central portion of a case at said output station to a raised position slightly above the bottom plane of a case at said output station, said ram means being operable to push up the bottom flaps of said case to break the bottom slightly inward upon movement of said substantially conical member from its lowered position to its raised position.

3. Case setup apparatus for foldable corrugated cases received in a knock-down configuration in accordance with claim 2 and further comprising:

a break plate disposed in the rectilinear path of the foremost end panel of a case being moved by said reciprocating member for contacting said foremost end panel to open the case to a substantially rectangular configuration as the case is moved past the break plate.

4. Case setup apparatus for foldable corrugated rectangular cases received in a knocked-down configuration, each case having opposite side panels and opposite end panels, each panel having a top and a bottom flap with a slot defined between adjacent flaps comprising:

feeder means for maintaining a plurality of said knocked-down cases in a stack;

case opening means having a reciprocating member selectively engageable with the foremost side panel of the foremost case in said stack to pull said side panel rectilinearly away from said feeder means, said case opening means including a first elongate retaining means mounted in register with the slot between the top flaps of the foremost side end panels and a second elongate retaining means mounted in register with the slots between the bottom flaps of the foremost side and end panels for selective engagement with the top and bottom side flaps of the rearmost side panel opposite to the side panel engaged by the reciprocating member until said reciprocating member has pulled the foremost panel of said case far enough to open said case into a tubular configuration;

means operable to fold the bottom end flap of said case to a substantially closed position with said case in a tubular configuration;

means for then transporting said case through an intermediate station into a plow which inwardly folds the bottom side flaps of said case to a substantially closed position; and adhesive applicator means disposed at said intermediate station and operable to apply an adhesive substance to the bottom flaps of the case passing therethrough.

5. Case setup apparatus for foldable corrugated cases received in a knocked-down configuration in accordance with claim 4 and further comprising:

a horizontal supporting plate disposed beneath said case at an output station adjacent said plow means; and ram means disposed above a case at said output station, said ram means including a horizontally oriented rectangular plate selectively movable from a raised position above the central portion of a case at said output station to a lowered position in contact with the bottom of a case at said output station, said ram means being operable to lower said rectangular plate into a case at said output station and press the case bottom against said supporting plate.

6. In a case setup apparatus for foldable cases received in a knocked-down configuration;

(a) means for opening a knocked-down case into a tubular rectangular configuration and presenting the case to a bottom end flap closing station;

(b) means restraining a case at said closing station from upward movement;

(c) a first lever arm disposed at said closing station and rotatably mounted for selective movement between a lowered position wherein said lever arm is in substantially vertical alignment adjacent one bottom end flap of a case at said closing station and a raised position wherein said lever arm is in substantially horizontal alignment underneath a case at said closing station, said first lever arm being operable to fold said one bottom end flap inwardly to a closed position upon rotation of said first lever arm from its lowered position to its raised position, said first lever arm then providing a horizontal track supporting the bottom of said case; and (d) a second lever arm disposed in said closing station and rotatably mounted for selective movement between a lowered position adjacent and below the other bottom end flap of a case at said closing station and a raised position wherein said lever arm is underneath a case at said closing station and in substantial alignment with said first lever arm, said second lever arm being operable to fold said other bottom end of flap inwardly to a closed position upon rotation of said second lever arm from its lowered position to its raised position, said second lever arm then providing a further horizontal track supporting the bottom of said case.

7. Case setup apparatus for foldable cases received in a knocked-down configuration, comprising:

(a) feeder means for maintaining a plurality of said knocked-down cases in a stack wherein the cases are identically vertically oriented with their bottom flaps lowermost, said feeder means including means for continually urging said stack toward a loading station with a predetermined force;

(b) first and second elongate retaining members fixedly mounted one above the other in vertically opposing alignment at said loading station, said first member depending downwardly in register with the uppermost vertical slot in the foremost panel of said cases, said second member projecting upwardly in register with the lowermost vertical slot in the foremost panel of said cases, said retaining members being smaller than said slots so that the foremost panel of the foremost case in said stack will freely pass by said retaining members, said predetermined force being such that the foremost case in said stack will be retained at said loading station by contact of its rearmost panel with said retaining members;

(c) a reciprocating member selectively movable perpendicular to the panel surfaces of the cases in said stack between a first position at said loading station and a second position at a bottom end flap closing station, said reciprocating member having a vacuum cup mounted for engagement with the foremost panel of the foremost case in said stack when said reciprocating member is at said first position to secure said foremost panel thereto, said second position being spaced from said first position a sufficient distance so that upon movement of said reciprocating member from said first position to said second position the foremost case in said stack will be pulled open into a tubular rectangular configuration and its rearmost panel pulled free from said retaining members, said vacuum cup being selectively disengageable from the foremost panel of said case when said reciprocating memebr is at said second position;

(d) means restraining a case at said closing station from upward movement;

(e) a first lever arm disposed at said closing station and rotatably mounted for selective movement between a lowered position wherein said lever arm is in substantially vertical alignment adjacent one bottom end flap of a case at said closing station and a raised position wherein said lever arm is in substantially horizontal alignment underneath a case at said closing station, said first lever arm being operable to fold said one bottom end flap inwardly to a closed position upon rotation of said first lever arm from its lowered position to its raised position, said first lever arm then providing a horizontal track supporting the bottom of said case;

(f) a second lever arm disposed at said closing station and rotatably mounted for selective movement between a lowered position adjacent and below the other bottom end flap of a case at said closing station and a raised position wherein said lever arm is underneath a case at said closing station and in substantial alignment with said first lever arm, said second lever arm being operable to fold said other bottom end of flap inwardly to a closed position upon rotation of said second lever arm from its lowered position to its raised position, said second lever arm then providing a further horizontal track supporting the bottom of said case; and (g) means for then transporting said case from said closing station into means operable to fold the bottom side flaps of said case to a substantially closed position.

8. Case setup apparatus for foldable cases of the four-flap type received in a knocked-down configuration, comprising:

(a) feeder means for maintaining a plurality of said knocked-down cases in a stack wherein the cases are identically vertically oriented with their bottom flaps lowermost, said feeder means including means for continually urging said stack toward a loading station with a predetermined force;

(b) first and second elongate retaining members fixedly mounted one above the other in vertically opposing alignment at said loading station, said first member depending downwardly in register with the uppermost vertical slot in the foremost panel of said cases, said second member projecting upwardly in register with the lowermost vertical slot in the foremost panel of said cases, said retaining members being smaller than said slots so that the foremost panel of the foremost case in said stack will freely pass by said retaining members, said predetermined force being such that the foremost case in said stack will be retained at said loading station by contact of its rearmost panel with said retaining members;

(c) a reciprocating member selectively movable perpendicular to the panel surfaces of the cases in said stack between a first position at said loading station and a second position at a bottom end flap closing station, said reciprocating member having a vacuum cup mounted for engagement with the foremost panel of the foremost case in said stack when said reciprocating member is at said first position to secure said foremost panel thereto, said second position being spaced from said first position a sufficient distance so that upon movement of said reciprocating member from said first position to said second position the foremost case in said stack will be pulled open into a tubular rectangular configuration and its rearmost panel pulled free from said retaining members, said vacuum cup being selectively disengageable from the foremost panel of said case when said reciprocating member is at said second position;

(d) means restraining a case at said closing station from upward movement;

(e) a first lever arm disposed at said closing station and rotatably mounted for selective movement between a lowered position wherein said lever arm is in substantially vertical alignment adjacent one bottom end flap of a case at said closing station and a raised position wherein said lever arm is in substantially horizontal alignment underneath a case at said closing station, said first lever arm being operable to fold said one bottom end flap inwardly to a closed position upon rotation of said first lever arm from its lowered position to its raised position, said first lever arm then providing a horizontal track supporting the bottom of said case;

(f) a second lever arm disposed at said closing station and rotatably mounted for selective movement between a lowered position adjacent and below the other bottom end flat of a case at said closing station and a raised position wherein said lever arm is underneath a case at said closing station and in substantial alignment with said first lever arm, said second lever arm being operable to fold said other bottom end of flap inwardly to a closed position upon rotation of said second lever arm from its lowered position to its raised position, said second lever arm then providing a further horizontal track supporting the bottom of said case;

(g) means for then transporting said case through means operable to inwardly fold the bottom side flaps of said case to a substantially closed position and then present said case to an output station; and (h) ram means disposed at said output station, said ram means including an upwardly projecting substantially conical member selectively movable from a lowered position beneath the central portion of a case at said output station to a raised position slightly above the bottom plane of a case at said output station, said ram means being operable to push up the bottom flaps of said case to break the bottom slightly inward upon movement of said substantially conical member from its lowered position to its raised position.

9. A case setup apparatus for foldable cases received in a knocked-down configuration in accordance with claim 6 wherein said means for opening a knocked-down case into a tubular rectangular configuration and presenting the case, to a bottom end flap closing station comprises:

feeder means for maintaining a plurality of said knocked-down cases in a stack wherein the cases are identically vertically oriented with their bottom flaps lowermost, said feeder means including means for continually urging said stack toward a loading station with a predetermined force;

case opening means for pulling the front side panel surface of the foremost case in said stack away from said feeder means to open said case into a tubular rectangular configuration and transport it to a bottom end flap closing station, said case opening means being selectively disengageable from the open case at said closing station.

10. Case setup apparatus for foldable cases received in a knocked-down configuration, comprising:

means for maintaining a plurality of said knocked-down cases in a stack wherein the cases are identically vertically oriented with their bottom flaps lowermost;

case opening means for pulling the foremost panel of the foremost case in said stack rectilinearly away from said feeder means in a direction perpendicular to said panel to open said case into a tubular rectangular configuration while pulling the case from the stack and to transport it in upright orientation to a bottom end flap closing station adjacent said stack;

pivoting means at said bottom end flap closing station operable in response to said case arriving at said station for inwardly folding a bottom end flap of said case to a substantially closed position while said case is stationary; and means responsive to operation of said pivoting means for then feeding said case in upright orientation across said pivoting means with said closed end flap leading into plow means which inwardly fold the bottom side flaps of said case to a substantially closed position, said pivoting means providing a horizontal track supporting the bottom of said case while said feeding means moves said case across said pivoting means into said plow means.

11. Case setup apparatus for foldable cases received in a knocked-down configuration in accordance with claim 10 wherein said means for feeding the case into the plow means moves the case at right angles to the direction the case is moved by said case opening means.

12. Case setup apparatus for rectangular foldable corrugated cases each having a pair of end panels and a pair of larger side panels, the cases being received in a knocked-down configuration with one end and side panel forward and the other end and side panel rearward and flat against the foremost panel, comprising:

(a) feeder means for maintaining a plurality of said knocked-down cases in a stack wherein the cases are identically vertically oriented with their bottom flaps lowermost, said feeder means including means for continually urging said stack toward a loading station with a predetermined force;

(b) first and second elongate retaining members fixedly mounted one above the other in vertically opposing alignment at said loading station, said first member depending downwardly in register with the uppermost vertical slot in the foremost panel of said cases and in the path of the top flap of the rear side panel, said second member projecting upwardly in register with the lowermost vertical slot in the foremost panel of said cases and in the pat hof the bottom flap of the rear side panel, said retaining members being smaller than said slots so that the foremost panel of the foremost case in said stack will freely pass by said retaining members and the rear side panel will be restrained by said retaining members; and (c) a reciprocating member selectively movable perpendicular to the panel surfaces of the cases in said stack between a first position at said loading station and a second position away from said loading station, said reciprocating member having a vacuum cup mounted for engagement with the foremost side panel opposite the retained side panel of the foremost case in said stack when said reciprocating member is at said first position to secure said foremost side panel thereto, said second position being spaced from said first position a sufficient distance so that upon movement of said reciprocating member from said first position to said second position the foremost case in said stack will be pulled open into a tubular configuration and its rearmost panel pulled free from said retaining members, said vacuum cup being selectively disengageable from the foremost side panel of said case when said reciprocating member is at said second position.

*13. Case setup apparatus for foldable corrugated cases each having a pair of end panels and a pair of side panels, the cases being received in a knocked-down configuration with one end and side panel forward and the other end and side panel rearward and flat against the foremost panel, comprising:*

*(a) feeder means for maintaining a plurality of said knocked-down cases in a stack wherein the cases are identically vertically oriented with their bottom flps lowermost, said feeder means including means for*

*continually urging said stack toward a loading station with a predetermined force;*

*(b) retaining means fixedly mounted in vertical orientation at said loading station and extending in register with a vertical slot in the foremost panel of said cases and in the path of a flap of the rear side panel, said retaining means being smaller than said slot so that the foremost panel of the foremost case in said stack will freely pass by said retaining means and the rear side panel will be restrained by said re-retaining means;*

*(c) a reciprocating member selectively movable perpendicular to the panel surfaces of the cases in said stack between a first position at said loading station and a second position away from said loading station, said reciprocating member having vacuum cup means mounted for engagement with the foremost side panel opposite the retained side panel of the foremost case in said stack when said reciprocating member is at said first position to secure said foremost side panel thereto, said second position being spaced from said first position a sufficient distance so that upon movement of said reciprocating member from said first position to said second position the foremost case in said stack will be pulled open into a tubular configuration, said vacuum cup being selectively disengageable from the foremost side panel of said case when said reciprocating member is at said position;*

*(d) means for inwardly folding the bottom end flaps of said case to a substantially closed position; and*

*(e) means for then feeding said case into closing means operable to fold the bottom side flaps of said case to a substantially closed position.*

*14. Case setup apparatus for foldable corrugated cases received in a knocked-down configuration, each case having opposite side panels and opposite end panels, each panel having a top and a bottom flap comprising:*

*feder means for maintaining a plurality of said knocked-down cases in a stack;*

*case opening means having a reciprocating member selectively engageable with the foremost side panel of the foremost case in said stack to pull said side panel rectinlinearly away from said feeder means, said case opening means including an elongate retaining means mounted in register with a slot in the foremost panels for selective engagement with a flap of the rearmost panel opposite to the side panel engaged by the reciprocating member until said reciprocating member has pulled the foremost panel of said case far enough to open said case into a tubular configuration;*

*means operable to fold the bottom end flap of said case toward a closed position with said case in a tubular configuration;*

*means for then transporting said case through an intermediate station into a plow which inwardly folds the bottom side flaps of said case to a substantially closed position; and*

*adhesive applicator means disposed at said intermediate station and operable to apply an adhesive substance to the botom flaps of the case passing therethrough.*

*15. Case setup apparatus in acordance with claim 14 wherein said means operable to fold the bottom end flap of said case toward a closed position is mounted below a pusher plate for transporting said case to said intermediate station.*

*16. Case setup apparatus for rectangular foldable corrugated cases each having a pair of end panels and a pair of side panels, the cases being received in a knocked-down configuration with one end and side panel forward and the other end and sid panel rearward and flat against the foremost panel, comprising:*

*(a) feeder means for maintaining a plurality of said knocked-down cases in a stack wherein the cases are identically vertically oriented with their bottom flaps lowermost, said feeder means including means for continually urging said stack toward a loading station with a predetermined force;*

*(b) elongate retaining means fixedly mounted in vertical orientation adjacent said loading station, said means extending in register with a vertical slot in the foremost panel of said cases and in the path of a flap of the rear side panel, said retaining means being smaller than said slot so that the foremost panel of the foremost case in said stack will freely pass by said retaining means and the rear side panel will be restrained by said retaining means; and*

*(c) a reciprocating member selectively movable perpendicular to the panel snrfaces of the cases in said stack between a first position at said loading station and a second position away from said loading station, said reciprocating member having a vacuum cup mounted for engagement with the foremost side panel opposite the retained side panel of the foremost case in said stack when said reciprocating member is at said first position to secure said foremost side panel thereto, said second position being spaced from said first a sufficient distance so that upon movement of said reciprocating member from said first position to said second position the foremost case in said stack will be pulled open into a tubular configuration and its rearmost panel pulled free from said retaining members, said vacuum cup being selectively disengageable from the foremost side panel of said case when said reciprocating member is at said second position.*

References Cited

The following references, cited by the Examiner, are of record in the patented file of this patent or the original patent.

UNITED STATES PATENTS

| | | | |
|---|---|---|---|
| 3,298,288 | 1/1967 | Anderson et al. | 93—53 SD |
| 1,561,103 | 11/1925 | Ney | 53—374 |
| 2,612,016 | 9/1952 | Anderson | 53—123 |
| 3,196,760 | 9/1965 | Terry | 93—44.1 |
| 1,791,963 | 2/1931 | Howard et al. | 93—49 X |
| 1,832,262 | 11/1931 | Stimpson | 93—49 |
| 2,217,784 | 10/1940 | Bennett et al. | 93—53 X |
| 2,289,820 | 7/1942 | Ardell | 93—53 X |
| 2,441,372 | 5/1948 | Quigley et al. | 93—53 |
| 2,248,841 | 5/1966 | Heffelfinger | 53—29 |
| 2,460,892 | 2/1949 | Lise | 93—53 |
| 2,547,963 | 4/1951 | Neal | 93—49 X |
| 2,660,844 | 12/1953 | Schroeder | 93—53 X |
| 2,887,022 | 5/1959 | Lubersky et al. | 93—49 X |
| 3,156,167 | 10/1964 | Galloway | 93—53 |
| 3,298,287 | 1/1967 | Peterson et al. | 93—49 |
| 3,312,154 | 4/1967 | Pierce | 93—49 |

FOREIGN PATENTS

| | | |
|---|---|---|
| 530,540 | 9/1956 | Canada. |
| 696,043 | 8/1953 | Great Britain. |

THERON E. CONDON, Primary Examiner

H. M. CULVER, Assistant Examiner

U.S. Cl. X.R.

93—53 SD